United States Patent [19]

Jones

[11] E Patent Number: Re. 32,906

[45] Reissued Date of Patent: Apr. 18, 1989

[54] SHOWER MIRROR APPARATUS

[76] Inventor: Thomas L. Jones, 11 Yorkshire St., Asheville, N.C. 28803

[21] Appl. No.: 128,400

[22] Filed: Dec. 3, 1987

Related U.S. Patent Documents

Reissue of:

[64] Patent No.: 4,557,003
Issued: Dec. 10, 1985
Appl. No.: 725,829
Filed: Apr. 22, 1985

[51] Int. Cl.[4] ..... A47K 3/22

[52] U.S. Cl. ..... 4/605; 4/597; 350/588

[58] Field of Search ..... 4/605, 597, 601, 598; 350/588; D6/525, 310; 165/37, 47, 168; 132/80 A

[56] References Cited

U.S. PATENT DOCUMENTS

| | | | |
|---|---|---|---|
| 3,594,063 | 7/1971 | Smillie, III | 350/588 |
| 3,708,218 | 1/1973 | Smillie, III | 350/588 |
| 4,072,397 | 2/1978 | Ross | 4/597 |
| 4,150,869 | 4/1979 | Hansen | 4/605 |
| 4,327,961 | 5/1982 | Kladitis | 350/588 |
| 4,556,298 | 12/1985 | Gottlieb | 350/588 |
| 4,558,929 | 12/1985 | Stephens et al. | 350/588 |

*Primary Examiner*—Lenard A. Footland
*Attorney, Agent, or Firm*—Finnegan, Henderson, Farabow, Garrett & Dunner

[57] ABSTRACT

A shower apparatus includes a mirror mounted in a housing which forms a plenum behind the mirror. All of the shower water is made to flow through the plenum to heat the back of the mirror and thereby through convection heat the reflective front surface to prevent fogging prior to being discharged through the shower head. Rotatable coupling joints are employed to facilitate positioning of the mirror.

10 Claims, 2 Drawing Sheets

SHOWER MIRROR APPARATUS

Matter enclosed in heavy brackets [ ] appears in the original patent but forms no part of this reissue specification; matter printed in italics indicates the additions made by reissue.

DESCRIPTION

1. Technical Field

The invention relates to a shower-mounted mirror.

2. Background Art

A common and well-known problem in using shaving equipment in a bathroom is that of the mirror fogging. It has been known to use hot water to prevent fogging of a mirror in a cabinet as in U.S. Pat. No. 4,327,961 and also to divert a portion of the hot water entering a shower stall to heat a mirror in the shower stall to prevent fogging of the mirror. U.S. Pat. Nos. 3,594,063, 3,708,218 and 4,150,869 are illustrative of past practices related to the present invention. The mirrors illustrated however are not adjustable in position and do not permit the mirror heating water to be used for showering.

In spite of the mentioned prior art, there has not been provided a type of shower mirror with easily installed plumbing and ease of positioning to meet the needs of varying conditions in the shower, people of different heights using the mirror and similar conditions. Also to be noted is that certain skin and allergy conditions require complete removal of shaving soap which is facilitated by shaving in the shower. Furthermore, the prior art shower mirrors do not provide for the mirror heating water to be used for showering.

Thus, the object of the present invention becomes that of providing an improved shower mirror overcoming the deficiencies of the prior art. Other objects will become apparent as the description proceeds.

DISCLOSURE OF THE INVENTION

The shower mirror apparatus of the invention incorporates a tee divider between the shower water connection and the shower head. This tee divider is in turn connected to a mirror assembly. The various interconnecting pipes, the tee divider and the mirror assembly are arranged such that all of the incoming shower water is diverted into the mirror assembly, passes behind the back face of the mirror and then exits to the shower head such that the front face of the mirror is heated or is at least raised to a temperature higher than the temperature of the water exiting the shower head. The mirror is thus prevented from fogging when used for shaving or other purposes and all the mirror heating water becomes available for showering. Additionally, a number of rotatable joints are utilized between the mirror assembly, the tee divider, and the shower head such that the mirror can be moved to any of a number of positions convenient to the users height and needs while taking a shower.

[BEST MODE FOR CARRYING OUT THE INVENTION]

Figure 1:
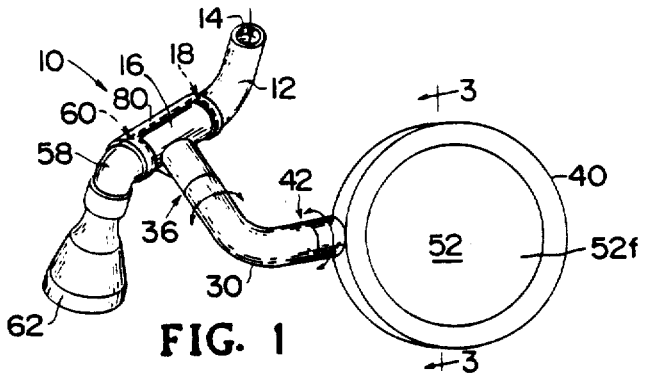
FIG. 1 is a perspective view of a shower mirror assembly according to the invention and shown disconnected from the shower water source but with the shower head installed.
Figure 3:
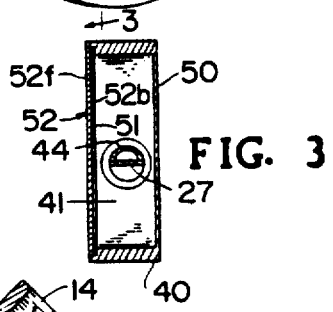
FIG. 3 is a section view taken generally in the direction of line 3—3 of FIG. 1.

The [invention] shower mirror assembly 10 of the invention comprises a downwardly-directed, curved, water connected pipe 12 having a threaded connection 14 for connecting to a mating pipe, not shown, conveying the water to be used for showering. The conventional temperature control is not shown. Connector pipe 12 connects to a tee divider 16 through a rotatable coupling joint 18 enabling tee divider 16 to be rotated relative to connector pipe 12 which is conventionally fixed when installed and connected to the shower water source pipe. Tee divider 16 has a divider 20 enabling the incoming shower water in passage 13 after passing through the snap-fit end portion 24 to be directed to passage 28 in a curved mirror connector pipe 30. Divider 27 of mirror connector pipe 30 mates with divider 20 of tee divider 16 to establish passage 28 and a later-referred to outlet passage 32.

Tee divider 16 and mirror connector pipe 30 connect through a rotatable coupling joint 36 and mirror connector pipe 30 connects to mirror housing 40 through another rotatable coupling joint 42. Mirror connector pipe 30 also includes a molded tubular portion 44 forming an extension of passage 28 for receiving the incoming shower water which is discharged from exit 29. A back wall 50 and a front wall 51 on mirror housing 40 confines the incoming shower water by forming a plenum 41 within housing 40. The back side 52b of the mirror 52 is in contact with front wall 51. The front side 52f of mirror 52 provides a light reflective surface for shaving or other purposes while taking a shower.

The shower water exiting exit 29 thus diffuses over the back side of front wall 51 transferring heat from the shower water to back side 52b of mirror 52 and thus heats the mirror front side 52f by convection and prevents fogging. The shower water then exits through exit 31 into passage 32, through the snap-fit end portion 34 and into passage 56 in curved shower pipe connector 58. Shower pipe connector 58 connects to tee divider 16 through another rotatable coupling joint 60. Shower head 62 threadably connects to the threaded end 64 of shower pipe connector 58. O-rings 66, 68, 70 and 72 effect sealing at the various rotatable joints.

Figure 2:
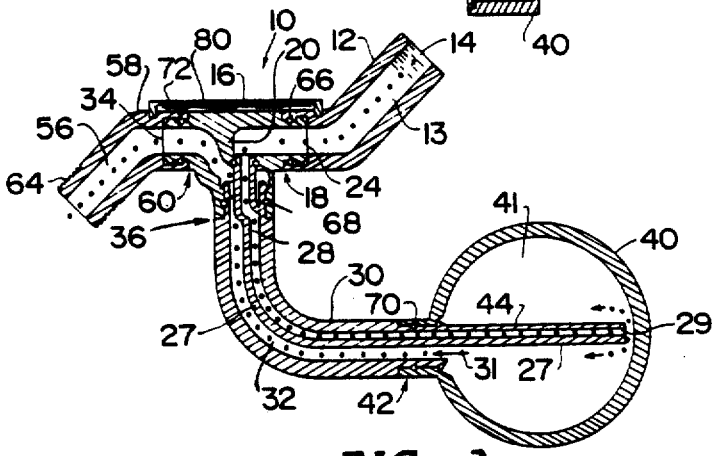
FIG. 2 is a section view taken through the various parts making up the shower mirror assembly of the invention and without the shower head.
Figure 4:
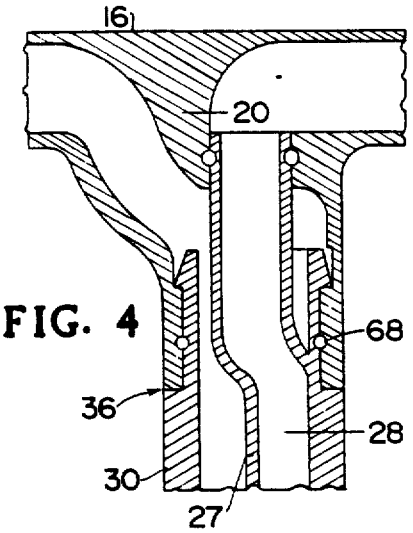
FIG. 4 is an enlarged, fragmentary, section view of the tee divider and the curved mirror connector pipe.
Figure 5:
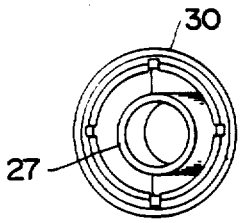
FIG. 5 is an enlarged, top plan view of the end of the curved mirror connector pipe adjacent the tee divider.

Water connector pipe 12, tee divider 16, mirror connector pipe 30, mirror housing 40 and shower connector pipe 58 may, if desired, be formed entirely of molded components with the various rotatable joints designed for snap-fit liquid tight connections according to conventional practices. Thus, the entire assembly as depicted in FIG. 2 can be installed simply by removing the conventional shower head and installing the assembly 10 shown in FIG. 2 with the shower head 62 being connected to the threaded connection 64. Once installed, the connector pipe 12 and shower pipe connector 58 will assume a relatively-fixed position relative to each other due to clip 80 fixedly secured at one end to pipe 12 and at the opposite end fixedly secured to connector 58, see FIG. 2. Tee divider 16 has limited rotation of about 180°, due to clip 80, about pipe 12 and connector 58. However, housing 40 may assume any of a multitude of positions by reason of tee divider 16 being rotatable with respect to connector pipes 12 and 58 and also because mirror housing 40 can rotate 360° with respect to mirror connector pipe 30 which in turn can also rotate 360° with respect to tee divider 16. The user is thus assured of achieving a mirror position suitable to the user's requirements, is assured of having a fog-free mirror and is also assured of having all the shower water used for heating the mirror also available for showering thus achieving all of the objects of the invention.

What is claimed is:

1. In a shower apparatus having a water supply for dispensing shower water through a shower head, the improvement comprising:

(a) a first tubular connector having a fixed connection to a shower water supply;

(b) a second tubular connector [mounting] *mounted* on one end of a shower head;

(c) a tee fitting including:

(i) an inlet connected to said shower water supply through said first tubular connector;

(ii) an outlet connected to said shower head through said second tubular connector; and (iii) an internal divider establishing a first passage communicating with said inlet and a second passage communicating with said outlet;

(d) a mirror assembly having:

(i) a housing having a back wall and a front wall;

(ii) a mirror mounted in said housing adjacent said front wall having a front reflective surface and a back surface; and (iii) a plenum formed by said front wall with said back wall for holding shower water to be placed in contact with said front wall which is in contact with said mirror back surface so as to transmit heat from said front wall to said mirror back and to heat said mirror front surface to prevent fogging thereof;

(e) a third tubular connector having:

(i) a first passage communicating said tee fitting first passage with said plenum for transferring shower water from said supply to said plenum to fill said plenum and through heat transfer heat said mirror; and (ii) a second passage communicating said tee fitting second passage with said plenum for transferring shower water which has heated said mirror back surface through heat transfer from said plenum to said shower head;

(f) rotatable coupling means joining said tee connector to said first, second and third tubular connectors and said third tubular connector to said housing whereby:

(i) said tee connector is enabled to rotate relative to said first and second tubular connectors;

(ii) said third tubular connector is enabled to rotate relative to said tee connector; and (iii) said mirror housing is enabled to rotate relative to said third tubular connector.

2. A shower apparatus as claimed in claim 1 wherein said tubular connectors, tee connector and mirror housing comprise plastic molded components.

3. In a shower apparatus as claimed in claim 1 wherein said third tubular connector includes an integral tubular portion thereof mounted within said plenum and said integral tubular portion forms a portion of said third tubular connector first passage in said plenum.

4. In a shower apparatus as claimed in claim 1 including a clip member secured at opposite ends to and enabling said first and second connectors to remain relatively fixed in relation to each other while allowing limited rotation of said tee connector between and with respect to said first and second connectors.

*5. A shower apparatus comprising:*

*a shower water supply means for providing a flow of water;*

*mirror means for receiving at least a portion of the flow of water comprising:*

*(i) a housing having a back wall and a front wall forming a plenum for receiving the portion of the flow of water;*

*(ii) a mirror mounted in said housing adjacent said front wall and having a front reflective surface and a back surface in contact with said front wall of said housing, thereby forming a heat exchange relationship between the plenum for receiving the portion of the flow of water and said reflective surface; and*

*means for diverting at least a portion of the flow of water to said mirror means, said means for diverting comprising a plurality of adjustable and rotatable rigid pipe-like means connected together and supporting said mirror means, said pipe-like means acting to carry the portion of the flow of the water from said shower water supply means to said mirror means to prevent fogging on said reflective surface of said mirror, whereby said plurality of rigid pipe-like means allow said mirror means to be moved to different positions with respect to said shower water supply means and said rigid pipe-like means act to retain said mirror means in said different positions.*

*6. A shower apparatus according to claim 5, wherein the entire flow of water is diverted to and from said mirror means.*

*7. A shower apparatus as claimed in claim 5, wherein said means for diverting at least a portion of the flow of water comprise plastic molded components.*

*8. A shower apparatus comprising:*

*shower water supply means for providing a flow of water;*

*mirror means for receiving at least a portion of the flow of water comprising:*

*(i) a housing for receiving the portion of water flow;*

*(ii) a mirror having a reflective surface mounted in said housing in heat exchange relationship with the portion of the water flow; and*

*means for diverting at least a portion of the water flow to said mirror means, comprising a plurality of adjustable and rotatable rigid pipe-like means for carrying the portion of the water flow to said mirror means to prevent fogging on said reflective surface wherein said rigid pipe-like means support and retain said mirror means in a plurality of positions with respect to said shower water supply means.*

*9. A shower apparatus as claimed in claim 8, wherein the entire flow of water is diverted to and from the mirror means.*

*10. A shower apparatus as claimed in claim 8, wherein said means for diverting at least a portion of the water flow comprise plastic molded components.*

* * * * *